United States Patent [19]

Aufderhaar et al.

[11] Patent Number: 4,583,747

[45] Date of Patent: Apr. 22, 1986

[54] BEARING SEAL FOR A CENTRIFUGE

[75] Inventors: Erhard Aufderhaar, Unterschleissheim; Ernst Gruebl, Munich; Siegfried Pfaff, Germering, all of Fed. Rep. of Germany

[73] Assignee: Krauss-Maffei A.G., Fed. Rep. of Germany

[21] Appl. No.: 678,417

[22] Filed: Dec. 5, 1984

[30] Foreign Application Priority Data

Dec. 5, 1983 [DE] Fed. Rep. of Germany ....... 3343938

[51] Int. Cl.4 ........................ F16J 15/447; F16J 15/40

[52] U.S. Cl. .......................................... 277/3; 277/12; 277/24; 277/53

[58] Field of Search ............. 277/3, 24, 12, 32, 53-55, 277/71, 72 R, 72 FM, 74, 79; 494/41; 209/199

[56] References Cited

U.S. PATENT DOCUMENTS

| | | | |
|---|---|---|---|
| 1,100,872 | 6/1914 | Hall | 494/41 |
| 1,149,578 | 8/1915 | Hall | 494/41 |
| 1,575,061 | 3/1926 | Jones et al. . | |
| 3,472,518 | 10/1969 | Harlan | 277/53 X |
| 3,601,307 | 8/1971 | Shapiro | 277/3 X |
| 3,643,964 | 2/1972 | Snelling et al. | 277/24 |
| 3,659,662 | 5/1972 | Dicky | 277/3 X |
| 3,729,128 | 4/1973 | Reed . | |
| 4,087,097 | 5/1978 | Bossens et al. | 277/3 |
| 4,350,283 | 9/1982 | Leonian | 494/41 X |
| 4,386,780 | 6/1983 | Dernedde | 277/24 X |
| 4,405,136 | 9/1983 | Elsing et al. | 277/12 |

*Primary Examiner*—Robert S. Ward
*Attorney, Agent, or Firm*—Robert J. Koch

[57] ABSTRACT

A bearing seal between the internal space of a centrifuge and its drive part utilizes, in a preferred embodiment, three similar sealing elements arranged in axial succession to each other and pressed against a protective bushing of the drive shaft in an elastic manner. The protective bushing of the drive shaft has a reduced diameter in the contact area of the sealing element closest to the internal space of the centrifuge, so that protective gas introduced into the space between the sealing elements and the subsequent sealing elements flows into the internal space of the centrifuge.

10 Claims, 5 Drawing Figures

BEARING SEAL FOR A CENTRIFUGE

BACKGROUND OF THE INVENTION

The invention relates to a bearing seal between the inner space of a centrifuge and its drive part, comprising annular sealing elements which elastically surround a drive shaft protective bushing. On the drive side, the sealing elements are exposed to a protective gas, such as nitrogen, which passes through the seal in the inside of the centrifuge.

Centrifuges are particularly used for the separation of suspensions into solids and liquid filtrates. In the pharmaceutical industry and in the production of food items, it is essential to maintain the internal space of the centrifuge which contains the centrifuge drum, clean with respect to the drive part of the centrifuge. A seal between the inner space of the centrifuge and the drive part is also necessary because explosive or aggressive gases which must be kept away from the drive part may be evolved in the course of centrifugation.

It is known to equip the bearing seal with an annular sealing element which is elastically pressed against the drive shaft of the centrifuge or a protective bushing provided on the drive shaft. On the drive side, an inert protective gas streams against the sealing element and passes through a predetermined leak between the sealing element and the drive shaft. This functions to keep the seal free of dirt particles and to ensure that no gases may pass the seal in the opposite direction. Nitrogen is a suitable protective gas in most cases.

It is an object of the present invention to provide a bearing seal between the internal space of a centrifuge and its drive part, which operates reliably, requires little maintenance, and whose parts subject to wear may be easily replaced.

This object is attained by the bearing seal according to the invention, wherein at least two identical sealing elements are arranged in axial succession; the diameter of the protective bushing of the drive shaft is reduced in the contact area of the sealing element closest to the internal space of the centrifuge; and the protective gas passes through the sealing element.

Further objects, features and advantages of the present invention will become apparent from the detailed description of preferred embodiments which follows, when considered together with the attached figures of drawings.

DESCRIPTION OF PREFERRED EMBODIMENTS

Figure 1:
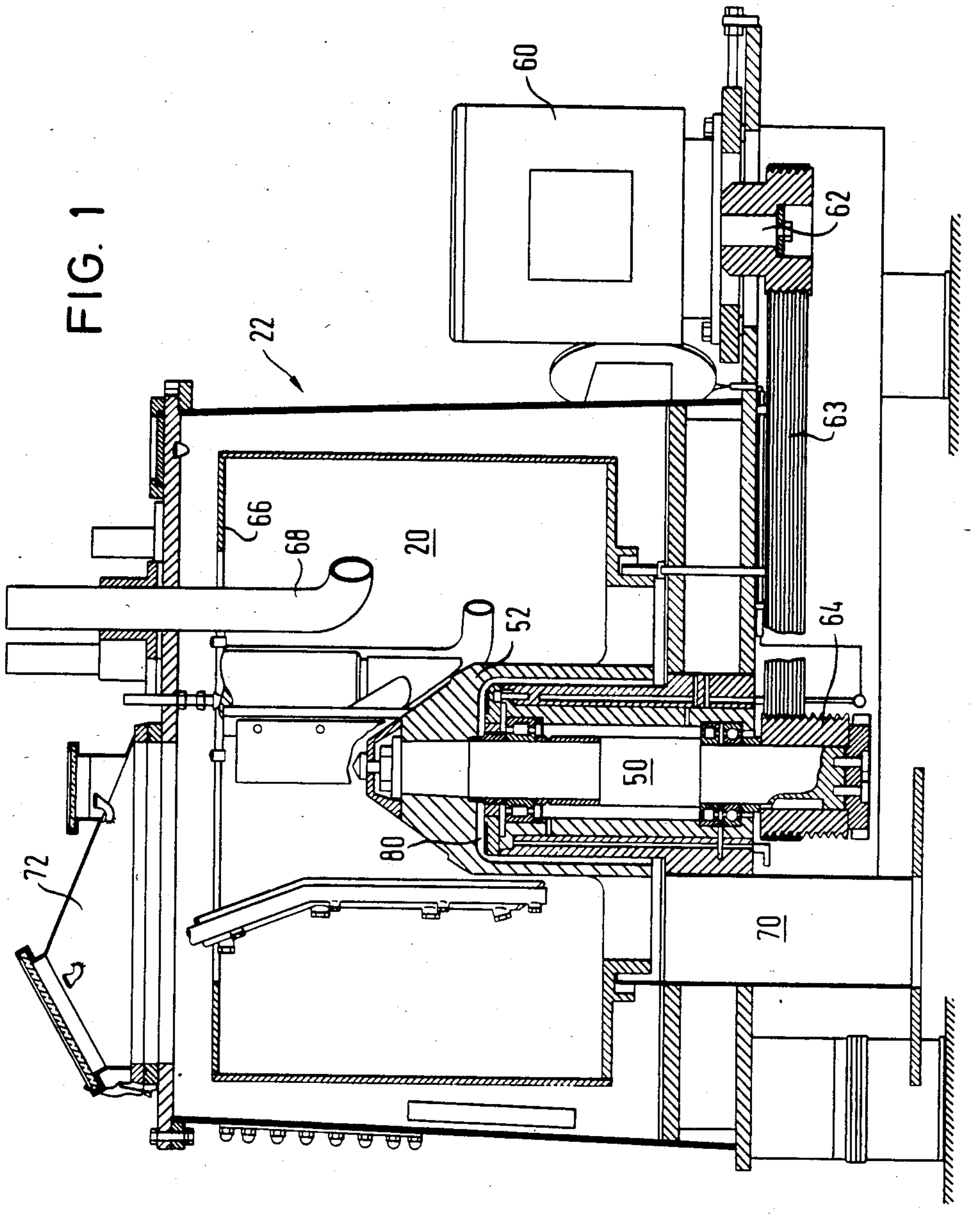
FIG. 1 shows a section through a centrifuge for which the bearing seal of the invention is to be provided.

Suspensions are introduced into the centrifuge 22 shown in FIG. 1 by means of a filling tube 68 into the inner space 20 of the centrifuge, for example. The drum 66 of the centrifuge 22 is rotated by means of a motor 60. The drive is effected by the shaft 62 of the motor, a V-belt 63, a V-belt disk 64 and the drive shaft 50 of the drum 66. The hub 52 of the drum is fixedly joined with the drive shaft 50 (see also FIG. 2). Solids which accumulate in the drum 66 during the course of centrifugation are removed from the centrifuge 22 by means of a discharge shaft 70.

Figure 2:
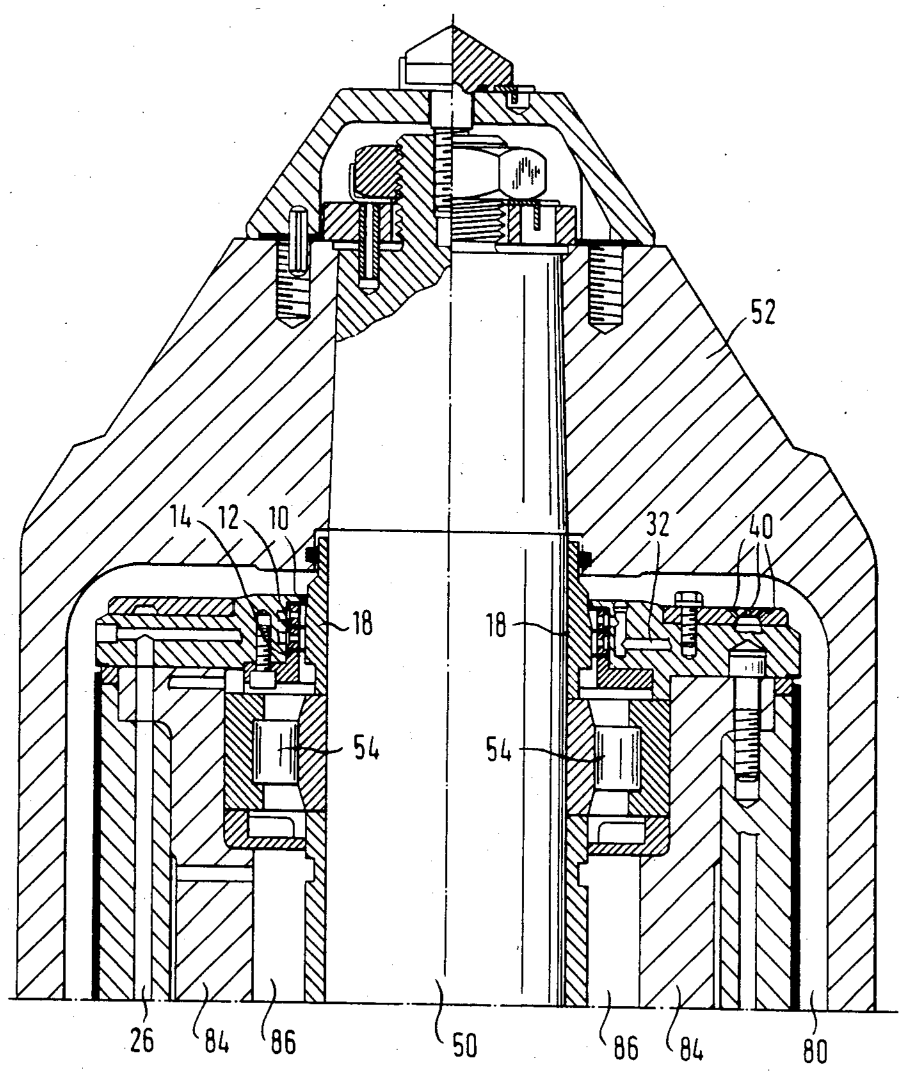
FIG. 2 shows an enlarged segment of the center section comprising the bearing seal of the centrifuge of FIG. 1.

Thus, the hub 52 of the drum shown in FIGS. 1 and 2 moves with the drive shaft 50, while the structural parts 84 (FIG. 2) do not rotate. A bearing seal (described supra) is provided between the stationary structural parts 84 (described in more detail below) and the rotating shaft 50. A roller bearing 54 is located between the stationary parts 84 and the drive shaft 50.

Figure 3:
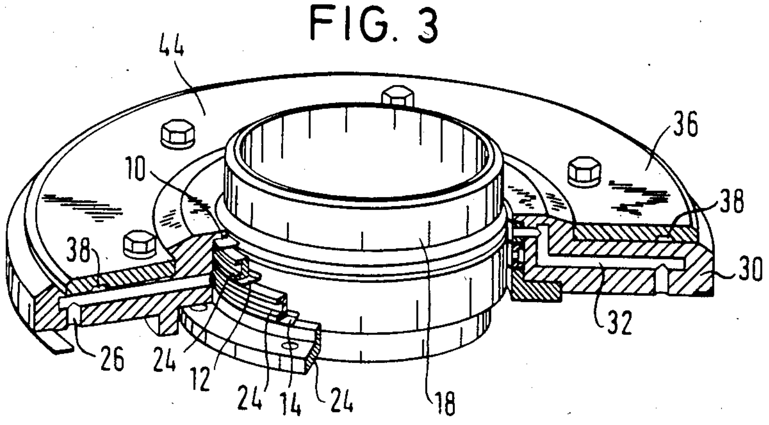
FIG. 3 shows a perspective view of the bearing seal.
Figure 4:
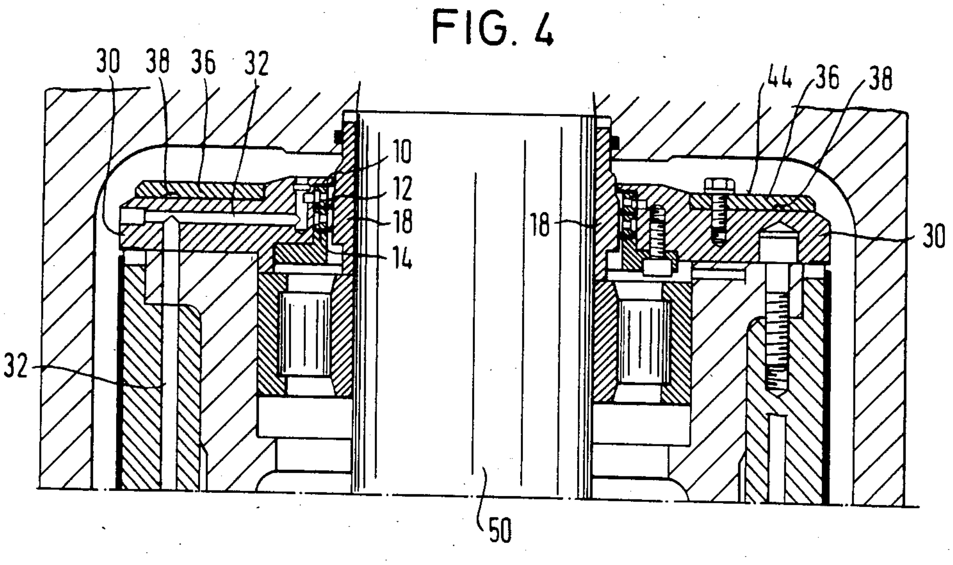
FIG. 4 shows an axial section through the bearing seal.

The seal according to the invention is shown in more detail in FIGS. 2, 3 and 4. A protective sleeve 18 surrounds the shaft 50. The protective sleeve cooperates with the sliding sealing elements 10, 12 and 14, is resistant to abrasion, and is also readily replaced. Thus, the sealing elements 10, 12 and 14 seal the internal space 20 of the centrifuge 22, which extends over the shaft 80 to the sealing element 10, from the drive part of the centrifuge, which extends from the other side over the shaft 86 to the sealing element 14.

FIG. 3. shows the arrangement of the sealing elements relative to the protective bushing 18 of the drive shaft. The sealing elements 10, 12 and 14 are arranged axially in succession to each other and press against the protective bushing 18 with their inner edges. Spacer rings 24 are used to mount the sealing elements 10, 12 and 14 which are clamped between said spacer rings from the outside. As seen in FIG. 4, the protective bushing 18 has a smaller diameter where it is in contact with the sealing element 10 which faces the inner space of the centrifuge 22, than where it is in contact with the other sealing elements 12 and 14. As the sealing elements 10, 12 and 14 are otherwise identical with one another, this measure results in the sealing element 10 being pressed against the surface of the protective bushing 18 with a lower pressure than the other two sealing elements 12 and 14.

According to FIGS. 3 and 4, the channel 32 for the protective gas leads into the space between the sealing elements 10 and 12. Because the diameter of the protective bushing 18 is reduced where the bushing is in contact with the upper sealing element 10, the sealing effect of the sealing element 10 is less than that of the sealing element 12 located under it. The slightly pressurized protective gas, nitrogen for example, will pass between the sealing element 10 and the protective bushing 18. The stream of the protective gas therefore passes through the channel 32 into the space between the sealing elements 10 and 12, into the shaft 80, and thus into the internal space of the centrifuge 22. This stream prevents dirt particles from the centrifuge from accumulating in the area of the seals and interfering with the seals. The stream also ensures that no explosive or aggressive gases from the centrifuge come in contact with the hot parts of the drive section.

Figure 5:
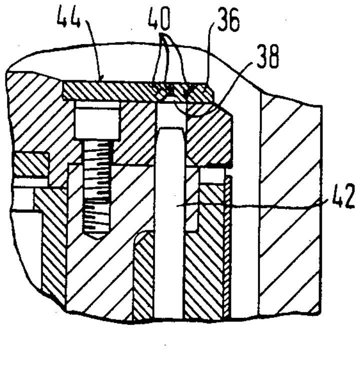
FIG. 5 shows a section through a flushing channel for the bearing seal.

According to FIG. 3, the sealing elements 10, 12 and 14 are arranged in a flange 30 together with their spacer rings 24. The flange 30 is not only perforated by the channel 32 for the protective gas, but also comprises a channel 26 for lubricants. The lubricant channel 26 serves to relubricate the two lower sealing elements 12 and 14 in larger intervals. In addition, a third channel system 42 is provided in the flange 30. By means of the channels 42, rinsing medium (or cleaning medium) passes into a circumferential groove 38. The groove is machined into the bottom side of an annular disk 36 which is mounted on the flange 30. The rinsing medium enters the groove 38 under pressure, and is sprayed out through fine channels 40 provided between the surface 44 of the annular disk 36 and the groove 38 (FIG. 5). In this manner, contaminations are dissolved and removed by the rinsing medium.

What is claimed is:

1. A bearing seal assembly between an internal space and a drive section of a centrifuge, comprising:

a drive shaft;

a protective bushing for the drive shaft;

a plurality of annular sealing elements collectively and elastically surrounding the protective bushing and arranged in axial succession from a first part of the protective bushing closest to the internal space of the centrifuge to a second part of the bushing which is closest to the drive section of the centrifuge;

a section of the protective bushing having a reduced diameter and surrounded by the sealing element closest to the internal space of the centrifuge; and means for passing protective gas through said sealing element closest to the internal space of the centrifuge.

2. A bearing seal assembly according to claim 1, further comprising a spacer ring between each of the annular sealing elements, said spacer rings clamping the annular sealing elements on their radially outer edges.

3. A bearing seal assembly according to claim 2, wherein the annular sealing elements extend radially inward past the spacer rings and are bent on the protective bushing toward the internal space of the centrifuge.

4. A bearing seal assembly according to claim 1, wherein the sealing elements are thicker and have drop-shaped cross-sections where they are in contact with the protective bushing.

5. A bearing seal assembly according to claim 1, further comprising a channel for lubricant which leads along the sealing elements.

6. A bearing seal assembly according to claim 1, further comprising a flange having a radially inward side upon which the spacer rings are mounted, and a plurality of feed-channels in the flange for protective gas and lubricant.

7. A bearing seal assembly according to claim 6, further comprising:

an annular disk mounted on said flange and having a side abutting said flange;

a groove in the annular disk on the side of the disk abutting said flange; and a rinsing medium channel which communicates with the groove.

8. A bearing seal assembly according to claim 7, further comprising:

an upper side of said annular disk which faces the internal space of the centrifuge; and a plurality of channels which lead from said groove in said disk to said upper side of said disk.

9. A bearing seal assembly according to claim 7, wherein said plurality of annular sealing elements comprise identically shaped sealing elements.

10. A bearing seal assembly according to claim 1, further comprising three identical annular sealing elements.

* * * * *